United States Patent [19]

Backes

[11] Patent Number: 5,219,382
[45] Date of Patent: Jun. 15, 1993

[54] SEALING AND GUIDING STRIPS

[75] Inventor: Heinz-Peter Backes, Wegberg, Fed. Rep. of Germany

[73] Assignee: Draftex Industries Limited, Edinburgh, Scotland

[21] Appl. No.: 871,531

[22] Filed: Apr. 21, 1992

[30] Foreign Application Priority Data

May 8, 1991 [GB] United Kingdom ............... 9109900

[51] Int. Cl.[5] .............................................. E06B 7/16
[52] U.S. Cl. ..................................... 49/440; 49/441; 49/492.1; 49/493.1
[58] Field of Search ................ 49/441, 492, 493, 440

[56] References Cited

U.S. PATENT DOCUMENTS

| | | | |
|---|---|---|---|
| 2,654,131 | 10/1953 | Poupitch | 49/492 X |
| 2,688,165 | 9/1954 | Kinish | 49/493 X |
| 2,716,787 | 9/1955 | Harris | 49/492 |
| 3,059,292 | 10/1962 | Harris | 49/492 |
| 3,763,596 | 10/1973 | Anderson | 49/492 X |
| 4,864,774 | 9/1989 | Onishi et al. | 49/492 X |
| 4,908,989 | 3/1990 | Omura et al. | 49/441 |
| 4,934,100 | 6/1990 | Adell | |
| 4,967,836 | 11/1990 | Nakamura | |
| 5,057,265 | 10/1991 | Kunert et al. | |

FOREIGN PATENT DOCUMENTS

| | | |
|---|---|---|
| 0375485 | 6/1990 | European Pat. Off. |
| 0427381 | 5/1991 | European Pat. Off. |
| 1343902 | 1/1974 | United Kingdom |
| 1578897 | 11/1980 | United Kingdom |
| 2147244 | 5/1985 | United Kingdom |
| 2182377 | 5/1987 | United Kingdom |

*Primary Examiner*—Philip C. Kannan
*Attorney, Agent, or Firm*—Leydig, Voit & Mayer

[57] ABSTRACT

A sealing and guiding strip, for a motor vehicle door having a slidable window pane, comprises a length of rubber and a rigid metal support. The sealing strip extends around the sides and top of the frame of the window and down into the hollow lower part of the door. It is produced by a molding operation, the rigid metal support being placed in the mold and thus becoming bonded to the rubber during the molding operation and the subsequent vulcanization. The metal support ensures that the finished sealing strip is rigidly held in the correct shape and configuration and it is thus easily handled, packed, delivered and fitted to the vehicle, the latter process being aided by clips or fixtures which are attached to the support when it is placed in the mold. The rubber defines a glass-receiving channel, and lips and for providing a seal against the adjacent part of the vehicle body.

11 Claims, 3 Drawing Sheets

SEALING AND GUIDING STRIPS

BACKGROUND OF THE INVENTION

The invention relates to sealing or guiding strips. Embodiments of the invention to be described in more detail below are in the form of sealing and guiding strips for use in motor vehicle body construction.

BRIEF SUMMARY OF THE INVENTION

According to the invention, there is provided a sealing or guiding strip, comprising rubber material formed by a single moulding operation into the required shape for the strip along its entire length, and bonded by the moulding operation to a substantially rigid support extending over substantially the whole of the length of the strip.

According to the invention, there is further provided a sealing and guiding strip for attachment to the window opening of a motor vehicle body door having a raisable and lowerable window pane, comprising rubber material formed in one piece to follow the sides and top of the window opening by a single moulding operation and defining a channel for receiving the window pane, and bonded to a rigid support during the moulding operation, the moulded support extending over at least substantially the whole of the length of the rubber material and carrying fixture means attached to it during the moulding operation and adapted to secure the strip in position in the frame of the window opening.

DESCRIPTION OF THE DRAWINGS

Sealing and guiding strips embodying the invention, and for use in motor vehicle body construction, will now be described, by way of example only, with reference to the accompanying drawings in which.

DESCRIPTION OF PREFERRED EMBODIMENTS

Figure 1:
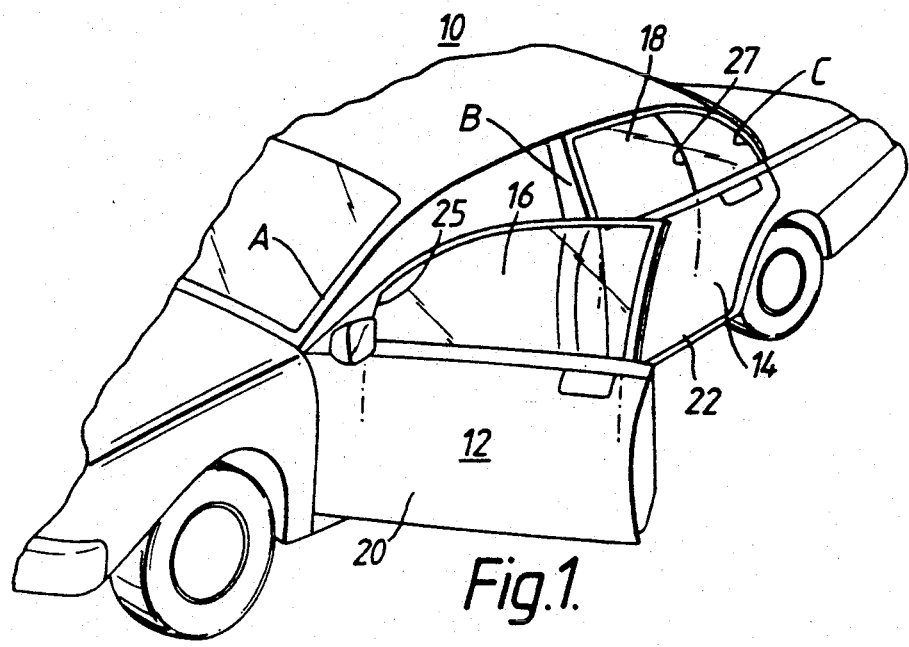
FIG. 1 is a side view of a motor vehicle, showing where the sealing and guiding strips are to be fitted.

As shown in FIG. 1, the body 10 of the vehicle has front and rear doors 12,14, each having a window 16,18 and a hollow lower part 20,22 in the normal way, into which and from which the window glass is lowered and raised. The vehicle is constructed to have the normal "A","B" and "C" pillars.

Figure 2:
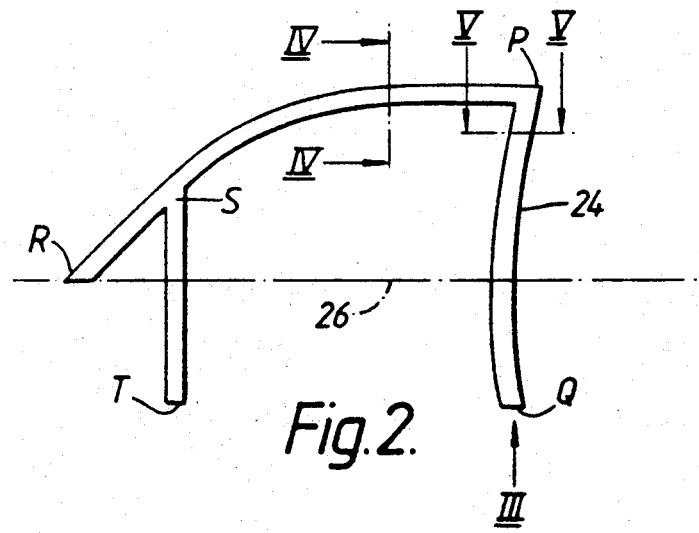
FIG. 2 is a side view of one of the sealing and guiding strips, before assembly onto the vehicle.

FIG. 2 shows a side view of the sealing and guiding strip 24 which is fitted to the front door 12 of the vehicle. As shown, the strip 24 is made in one piece (in the manner to be explained in more detail). It has a portion PQ which is fitted to the trailing edge of the door, the edge adjacent the B pillar of the vehicle. A portion PR extends along the top of the door and down the leading edge of the door adjacent the A pillar. In addition, there is a portion ST which extends adjacent the front edge of the door, in line with the edge 25 (FIG. 1) of the panel at the leading edge of the window 16 to which the external rear view mirror is attached. The window glass for the window 16 slides vertically within the area bounded by PQ on one side and ST on the other side. The dotted line 26 represents the waistline of the vehicle. It will thus be seen that parts of the lengths PQ and ST extend below the window space 16 into the hollow closed interior 20 of the door.

The sealing and guiding strip for the rear door 14 would be similarly arranged (again, all in one piece) but would of course be shaped to suit the shape of that door. In particular, it would have a portion (corresponding to the portion ST of FIG. 2) for fitting to the strut 27 (FIG. 1).

The sealing and guiding strip 24 is manufactured in a single integral piece by a single moulding operation. It thus contrasts with sealing and guiding strips which are manufactured by extrusion. With the latter type of strip, it is normally necessary to carry out a separate operation to construct a sharp corner in the sealing strip (e.g. at P in FIG. 2), this process involving mitre-cutting two separate lengths of strip and then joining them together as by adhesive or a localised moulding operation. This process is completely avoided by making the sealing and guiding strip 24 by means of a one-piece moulding operation.

In a manner to be explained in more detail, the sealing and guiding strip is constructed so as to provide a guide channel for receiving and guiding the edge of the window glass. In addition, however, it carries one or more external sealing portions which engage with the frame around the door opening, all with seals thereon, so as to seal the closed door.

Figure 3:
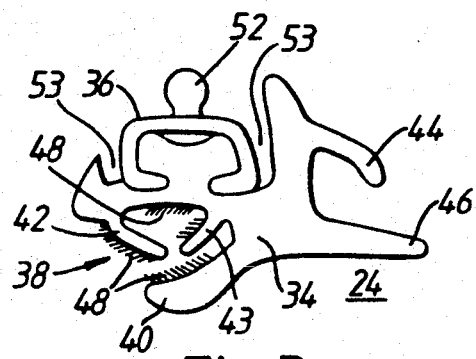
FIG. 3 is an end view looking in the direction III of FIG. 2.

FIG. 3 shows the construction of the sealing and guiding strip. As shown, it is constructed from rubber material 34 together with a rigid support 36. The rigid support 36 is preferably made of metal such as aluminium and is channel-shaped in configuration having a re-entrant mouth through which the rubber material 34 extends so as to lock the rubber material and the rigid support 36 together.

The rigid support 36 may extend along the whole or substantially the whole of the length of the strip 24.

The rubber material 34 is shaped to define a glass receiving channel 38 having a large external lip 40 and a smaller lip 42 and 43. Along the opposite side of the strip, the rubber material defines further sealing lips 44 and 46. Faces of the lips 40,42 and 43 are preferably covered with flock 48.

The rigid support 36 carries clips or fixtures 52 which extend through the base of its channel at intervals along its length.

As stated above, the sealing and guiding strip 24 is manufactured by a moulding operation. At the beginning of this moulding operation, the rigid support 36 is laid in the mould and supported therein at the appropriate position. The rigid support 36 may be in a single fabricated piece. Instead, however, it could be in the form of separate lengths which are held in the mould end to end, or possibly with small gaps between them, or pre-welded together. The fixtures or clips 52 are already in position. The rubber material 34 is then introduced into the mould and the moulding operation carried out and completed. After the completion of the moulding operation, the rubber is vulcanised and the result is to bond the rubber 34 and the support 36 firmly together. To aid this process, the rigid support 36 may be covered with a bonding agent when it is first placed in the mould. The rigid support may be held in the mould by means of suitable fixtures which (for example) extend through holes in the sides of the channel and are removed after the moulding operation.

Figure 4:
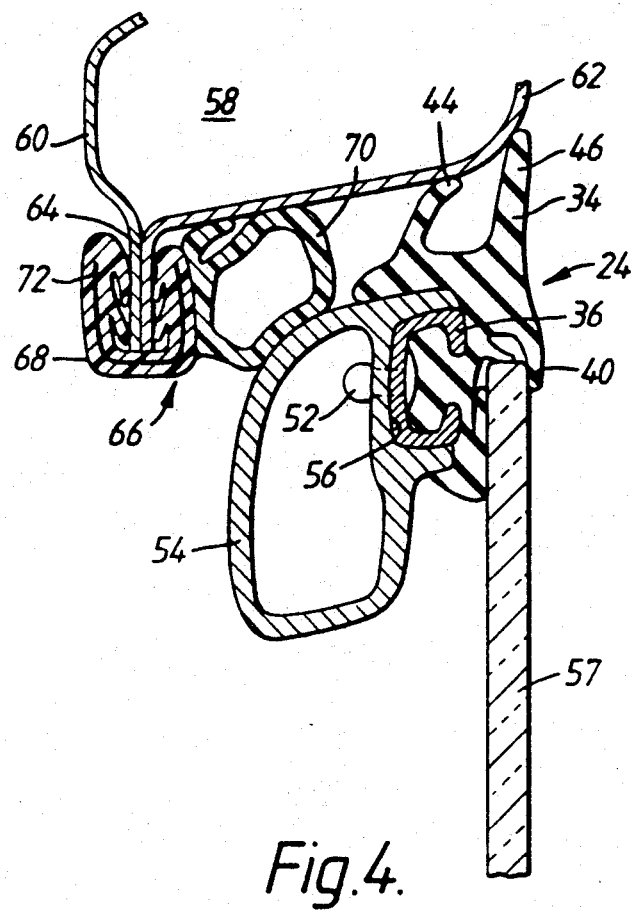
FIG. 4 is a section on the line IV—IV of FIG. 2, but being a section through the sealing and guiding strip at that position when fitted on the vehicle body.

FIG. 4 is a section taken on the line IV—IV of FIG. 2, but with the strip fitted to the door and with the door closed. As shown, the relevant part of the door, that is, the frame running along its top, is in the form of a hollow frame member 54 which defines a channel 56 for receiving and securely supporting the sealing and guiding strip 24, the latter being held in position in the channel 56 by means of the clips or fixtures 52 which extend through holes formed in the base of the channel 56. The side walls 54A and 54B of the frame member 54 enter into slots 53 (FIG. 3) adjacent the sides of the rigid support 36. The window glass 57 (for the window opening 16, FIG. 1), which is shown in the closed position in FIG. 4, extends into the channel 38 and deforms the lips 40,42 and 43, its faces being contacted by the flock 48.

The adjacent part of the vehicle body, which is the roof in this Figure, is shown at 58 and is made up of preformed panels 60 and 62 which are joined together to form a flanged joint 64. The flanged joint 64 supports an inner door seal 66 in the form of a channel-shaped gripping part 68 and a softer tubular sealing part 70. The gripping part 64 may be reinforced with a channel-shaped metal carrier 72. As shown, with the door closed the upper part of the door frame 54 makes sealing engagement with the tubular sealing part 70. An outer door seal is provided by the lips 44 and 46 which make contact with the body panel 60.

Figure 5:
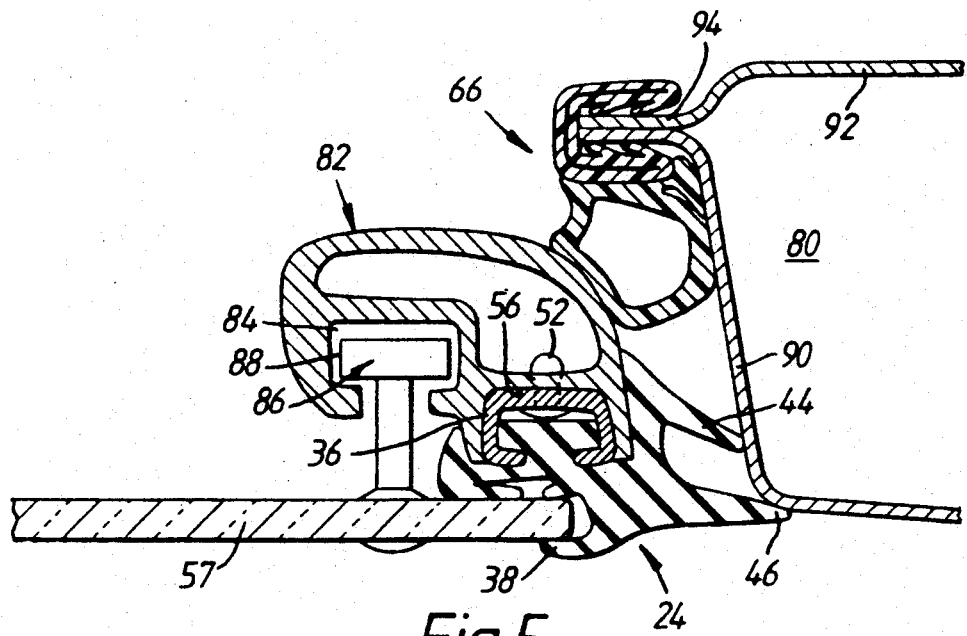
FIG. 5 is a section on the line V—V of FIG. 2, but being a section through the sealing and guiding strip at that position when fitted on the vehicle body.

FIG. 5 is a section on the line V—V of FIG. 2 but (like FIG. 4) showing the door in the closed position and thus also showing the adjacent part of the B pillar of the vehicle body, the B pillar being shown at 80.

FIG. 5 shows that the general form of the sealing and guiding strip 24 in this region (which of course corresponds to the region PQ of FIG. 2) is of generally similar configuration to that shown in FIGS. 3 and 4, and corresponding items are similarly referenced. Along this part of the door, however, the door frame differs slightly from that shown in FIG. 4. It comprises a hollow part 82 which defines not only the channel 56 for receiving the sealing and guiding strip 24 but another, adjacent, hollow channel 84 which has a re-entrant mouth. This channel forms a guideway for one or more glass-retaining pins 86 which have enlarged heads 88. Each pin is firmly attached to the window glass 57 and thus slides up and down within the channel 84 as the window glass is raised and lowered. The pin or pins 86 thus firmly support the glass. In similar fashion to that shown in FIG. 4, the edge of the glass is located in the channel 38 (see FIG. 3) and runs sealingly up and down within this channel. A "flush glass" effect is thus achieved.

The B pillar is made up of body panels 90 and 92 which are joined together as by welding to form a flanged joint 94. This carries the inner door seal 66 which (in similar fashion that that shown in FIG. 4 (seals against the door frame 82). In addition, the lips 44 and 46 form an outer door seal and sealingly engage the panel 90 of the B pillar.

Along the region ST (see FIG. 2) of the sealing and guiding strip 24, its construction will be generally the same as shown in FIGS. 3,4 and 5, except that the outer sealing lips 44 and 46 will be omitted (because of course there is no adjacent part of the vehicle body for them to seal against). Along this region, however, the door frame construction will be generally similar to that shown in FIG. 5; that is, the door frame construction will provide the channel 84 in which the heads 88 of one or more guide pins 86 slide to support the front edge of the glass.

Figure 6:
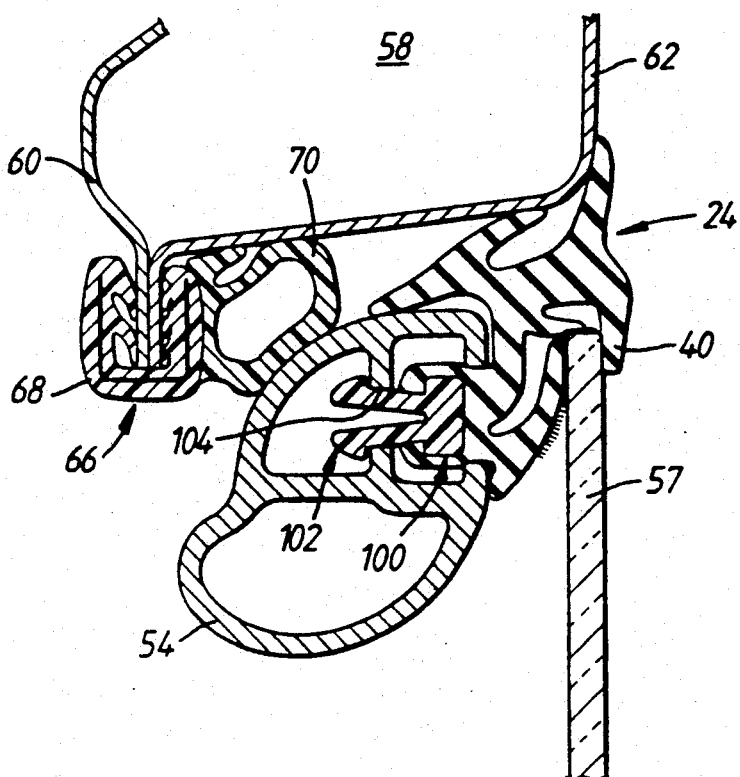
FIG. 6 is a view corresponding to FIG. 5 but showing a modified form of construction.

FIG. 6 shows a modified form of the sealing and guiding strip 24 shown in FIG. 4, and parts similar to those in FIG. 4 are correspondingly referenced. The strip 24 in FIG. 6 differs from that in FIG. 4 in that the rigid support 36 of FIG. 4 is replaced, in FIG. 6, with a rigid reinforcement 100 made of rigid plastics or rubber material. The rigid reinforcement 100 is formed to define a continuous clip 102 in the form of divergent leaves with enlarged heads. The reinforcement 100 is (like the rigid support 36 of FIGS. 3,4 and 5) placed in the mould prior to the moulding operation, so as to become incorporated into the strip 24 by the moulding operation and the subsequent vulcanisation. It is necessary, of course, for the plastics material of the reinforcement 100 to be selected to resist the moulding and vulcanisation temperatures and other parameters. It is preformed to have the appropriate shape.

As shown in FIG. 6, the strip 24 is held in the frame of the window by the continuous clip 102 which engages in a continuous slot 104 formed in the window frame 54.

A reinforcement similar to the reinforcement 100 could be used in the strip 24 along the B pillar, as shown in FIG. 5.

The arrangement shown in FIG. 6 has the advantage that the continuous channel 104 removes the need for accurate alignment, or accurate tolerances, between the clip 102 and the window frame. However, it is not necessary for the clip 102 to be continuous. Instead, there could be a series of separate but similarly shaped clips spaced apart along the reinforcement 100.

Figure 7:
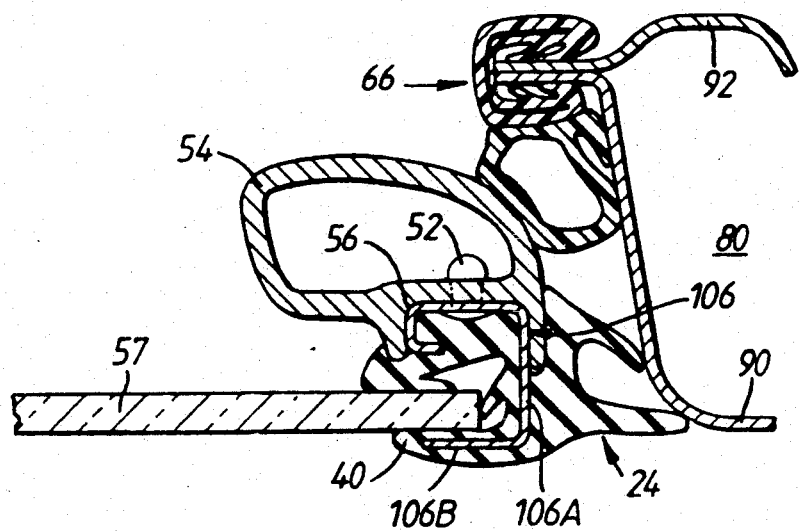
FIG. 7 is a view corresponding to FIG. 4, but showing a modified form of construction.

The arrangement of the guide channel 84 and the guide pins 86 shown in FIG. 5, for supporting the adjacent edge of the window glass 57, does not form part of the present invention and is merely one of various ways of supporting the window glass. FIG. 7 shows a modified form of the arrangement of FIG. 5, and parts in FIG. 7 similar to those in FIGS. 4 and 5 are correspondingly referenced.

As shown in FIG. 7, the window frame 54 has the shape shown in FIG. 4, rather than the shape shown in FIG. 5. In other words, it omits the guide channel 84 of FIG. 5, and the guide pins 86 of FIG. 5, which attach to and move with, the window glass are not necessary.

As is apparent from FIG. 7, the rigid support 106 of the strip 24 has an extension 106A which is bent at right angles and provides a portion 106B extending within the external lip 40, the latter being of slightly extended shape as compared with that shown in the other figures.

The right angle portion 106B thus provides support for the edge of the window glass 57 to hold it in position as it slides up and down in the window frame, while preserving the flush glass effect. A similar arrangement could be used over the region ST (FIG. 2) of the strip 24.

Because the sealing and guiding strip is moulded in a single operation, manufacture is simple and quick. No separate operation is necessary to form the corner in the strip. Furthermore, the incorporation of the rigid support 36, 100 or 106 into the strip 24 during the moulding operation, provides a number of substantial advantages. In particular, they ensure that the moulded strip, after extraction from the mould and vulcanisation, is substantially rigid and in the correct shape and curvature (in two planes) to fit the door frame. Because the strip is in this rigid form, handling and processing (during subsequent manufacturing processes, during handling and packaging, and during assembly to the vehicle body) is greatly facilitated. For example, the rigid nature of the strip considerably assists the flocking process which has to take place after moulding and vulcanisation to apply the flock 48,50 (FIG. 3) to the strip. The strip can be held rigidly within the flocking chamber and easily located in the correct position for the application to it of adhesive and then the flock.

Subsequent handling and packaging is easier than would be the case if the strip were flexible, and the strip is much less likely to be damaged or distorted during storage and delivery.

Furthermore, the vehicle manufacturer will find the strip easier to fit onto the door in view of its rigid nature. This process is facilitated by the incorporation of the clips or fixtures 52 or the clip 102 (FIG. 6). The fitter merely has to press the strip 24 into the channel 56 (see FIGS. 4 to 7) so that it clips easily into position. If replacement strips should subsequently be necessary, they can easily be fitted.

The window glass panes will normally follow curved planes and the door frame will thus be similarly shaped so as to lie in the same curved plane. The rigid metal support 36, 100 (FIG. 6) or 106 (FIG. 7) are thus preshaped accordingly before they are placed in the mould.

What is claimed is:

1. A sealing and guiding strip for attachment to the window opening of a motor vehicle body door having a raisable and lowerable window pane, the window opening having a window frame defining sides and a top, the strip comprising rubber material formed in one piece to follow the sides and top of the window opening by a single molding operation and defining a channel for receiving the window pane, a rigid support extending over at least substantially the whole of the length of the rubber material, and fixture means, the rubber material being bonded to the rigid support by the molding operation, the fixture means being attached to the rigid support by the molding operation and adapted to secure the strip in position in the frame of the window opening.

2. A strip according to claim 1, in which the rigid support carries an extension into the wall of the window-pane-receiving channel adjacent the outside edge of the window pane.

3. A strip according to claim 1, in which the fixture means comprises a plurality of separate fixtures positioned at predetermined places along the length of the support.

4. A strip according to claim 3, in which the fixtures are each adapted to engage a locking aperture in the frame of the window opening.

5. A strip according to claim 3, in which the fixture means is adapted to engage a continuous slot in the frame of the window opening.

6. A strip according to claim 1, in which the fixture means comprises a clip extending continuously along the length of the rigid support.

7. A strip according to claim 1, in which the channel for receiving the window pane is flocked.

8. A strip according to claim 1, in which the rigid support is made of metal.

9. A strip according to claim 1, in which the rigid support is made of plastics.

10. A strip according to claim 1, in which the rigid support is of channel-shape in cross-section.

11. A strip according to claim 10, in which the channel-shape of the rigid support is formed with re-entrant mouth portions so as to interlock it with the rubber during the moulding operation.

* * * * *